United States Patent [19]
Hall

[11] Patent Number: 5,150,524
[45] Date of Patent: Sep. 29, 1992

[54] BRUSH DEFLECTOR ATTACHMENT FOR CHAIN SAW

[76] Inventor: James A. Hall, 6197 W. Wagstaff Rd., Paradise, Calif. 95969

[21] Appl. No.: 743,610

[22] Filed: Aug. 12, 1991

[51] Int. Cl.⁵ .................. B23D 59/00; B27B 17/00
[52] U.S. Cl. ........................................ 30/382; 30/514
[58] Field of Search ............... 30/381, 382, 383, 514, 30/516

[56] References Cited

U.S. PATENT DOCUMENTS

| | | | |
|---|---|---|---|
| 3,380,493 | 4/1968 | Giroux | 30/382 |
| 3,384,136 | 5/1968 | Marin et al. | 30/382 |
| 3,680,607 | 8/1972 | Robinson | 30/383 |
| 3,808,684 | 5/1974 | Ludwig | 30/382 |
| 4,060,894 | 12/1977 | Hampton | 30/382 |
| 4,185,382 | 1/1980 | Rawlinson, Jr. | 30/383 |
| 4,193,193 | 3/1980 | Holzworth | 30/382 |
| 4,297,786 | 11/1981 | Tuggle | 30/382 |
| 4,317,285 | 3/1982 | Graham | 30/382 |
| 4,335,513 | 6/1982 | Owens | 30/382 |

Primary Examiner—Douglas D. Watts
Assistant Examiner—Hwei-Siu Payer
Attorney, Agent, or Firm—John J. Leavitt

[57] ABSTRACT

Presented is a safety attachment for a chain saw that is selectively attachable or detachable from the guide blade of the chain saw to provide a deflector that projects below the lower reach of the chain and functions to intercept small diameter flexible branches that are drawn rearwardly toward the operator by the chain.

12 Claims, 2 Drawing Sheets

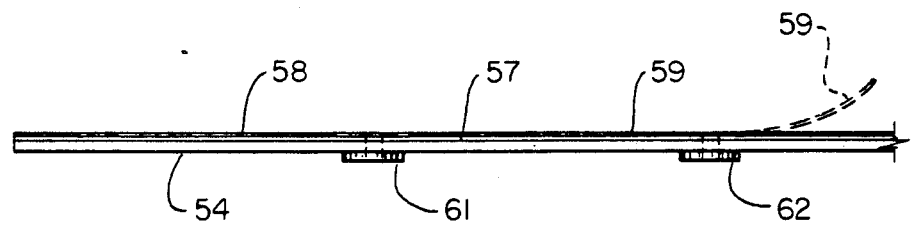
FIG. 6
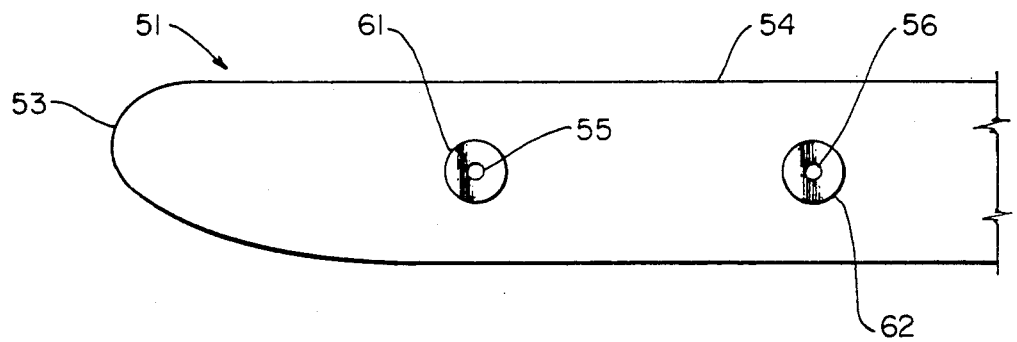
FIG. 5
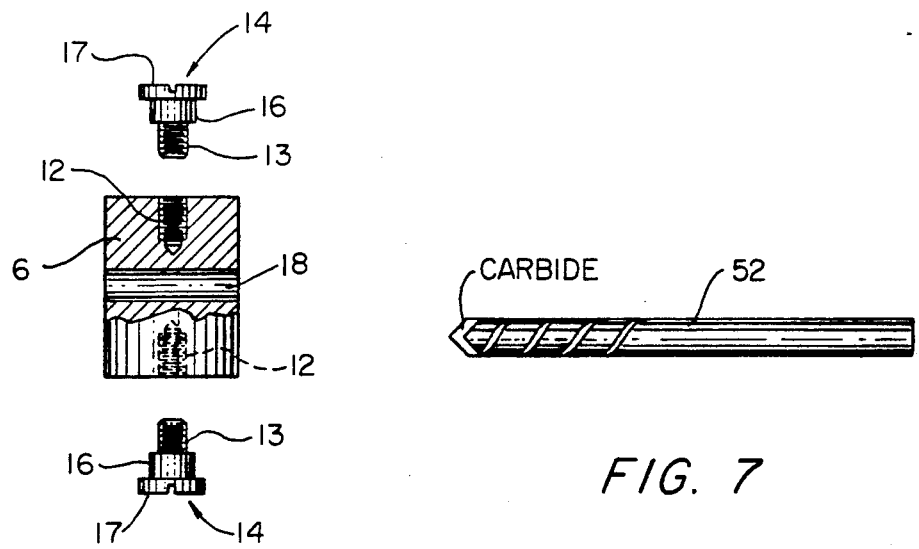
FIG. 4
FIG. 7

BRUSH DEFLECTOR ATTACHMENT FOR CHAIN SAW

BACKGROUND OF THE INVENTION

1. Field of the Invention

This invention relates to chain saws, and particularly to a safety attachment for a chain saw that functions as a deflector of small diameter branches.

2. Description of the Prior Art

A preliminary patentability and novelty search in connection with this invention has revealed the existence of four United States patents that are directed to safety attachments for chain saws. These patents are as follows:

| 3,380,493 | 3,384,136 | 4,060,894 |
|---|---|---|
| | 4,335,513 | |

A review of these patents indicates that while the structures disclosed are attachments for chain saws, the purpose of the attachment is entirely different from the purpose of the present invention. It is very well known among chain saw operators with hands-on experience that chain saws tend to kick back toward the operator if the end of the chain saw remote from the operator strickes a log or branch. The patents listed above disclose safety devices that minimize or eliminate the tendency of kick-back of a chain saw, or minimize the danger therefrom.

Experienced chain saw operators are aware that both the top and bottom reaches of the chain of a chain saw may be used to cut branches. Usually, however, it is the bottom reach of the chain that is used most. It has been found that when the bottom reach of the chain engages a substantial branch having appreciable thickness, the pull of the chain teeth against the branch tends to pull the housing of the saw toward the branch. Many models of chain saws take advantage of this tendency and provide sharp projections on the front surface of the housing that function not unlike teeth to bite into the branch, facilitating a rocking motion of the chain saw as it penetrates the thickness of the branch. This tendency to pull the saw housing toward the substantial branch being cut is due to the fact that the branch itself is relatively inflexible, while the saw is particularly mobile and is dragged forward by the chain.

However, when brush and small flexible branches are attempted to be cut with a chain saw, particularly with the lower reach of the chain saw, there is a tendency for the chain saw teeth to bite into the thin flexible branch or brush and whip it at high velocity toward the operator of the saw before the chain cuts the flexible branch. The impact of such flexible branches can be painful to the operator, can cause injury to the operator in addition to pain, and can cause the operator to flinch in such a manner that may cause loss of balance, which can lead to much more serious injury from the rotating chain of the chain saw.

Accordingly, it is one of the important objects of the present invention to provide a safety attachment for the blade of a chain saw that deflects the rearward whip of small branches by the chain saw, and which will also function as an abutment to prevent the saw from being pulled forwardly by the chain when larger less flexible branches are cut with the chain saw.

It frequently happens that it is desirable to use the chain saw for larger branches without the impediment of a safety attachment. Accordingly, it is another object of the invention to provide a safety attachment for chain saws that may be easily applied for use when needed for cutting small diameter flexible branches, and may be just as easily removed for use of the chain saw without the safety attachment.

The popularity of the chain saw has skyrocketed in the recent past. The cost of very effective large and small chain saws has been reduced considerably since the chain saw was first introduced, and as a consequence, many people now own chain saws that use them only infrequently, and for short lengths of time, for cutting small shrubs and brush as distinguished from the larger type chain saws used to cut down full-grown trees in the forests, for example. Accordingly, it is another object of the invention to provide a chain saw safety attachment as an article of manufacture that may be applied to the blades or chain guides of chain saws that are already in existence.

When working with a chain saw, it is an advantage from the point of view of safety that the operator not carry metallic tools, or wear loose clothing, or carry pouches in which tools may be carried, that pose the possibility of becoming entangled with the chain of the chain saw. Accordingly, a still further object of the invention is the provision of a safety attachment for chain saws that may be applied and removed from the chain saw without the use of tools.

To apply the safety attachment of my invention to a chain saw that one already owns, it is necessary that two small apertures be bored in the chain saw blade or chain guide plate. Since most of these blades or guide plates are hardened to withstand the wear imposed by the chain, it is advisable that a high speed carbon or carbide tip drill bit be used to bore the apertures for detachably mounting the safety attachment on the saw guide. Accordingly, another object of the invention is the provision of a template to accurately guide placement of the apertures and to center the drill bit during the boring operation and a carbide tip drill bit with the safety attachment as a kit for use in equipping the chain saw with the safety attachment.

The invention possesses other objects and features of advantage, some of which, with the foregoing will be apparent from the following description and the drawings. It is to be understood that the invention is not limited to the embodiment illustrated and described since it may be embodied in various forms within the scope of the appended claims.

SUMMARY OF THE INVENTION

In terms of broad inclusion, the safety attachment for chain saws of my invention comprises a flat plate base member adapted to lie flat against the blade or chain guide of the saw and to be retained thereon by a latch assembly engaging two small apertures bored in the blade or chain guide in a location that will not impair the strength of the blade. From the flat base plate there projects a deflector arm that extends downwardly perpendicular to the base plate and in spaced parallelism to the plane of the blade or chain guide, and which extends well below the level of the lower reach of the chain. Preferably, the base plate of the safety attachment is detachably secured to the blade or chain guide adjacent the forward end of the chain so that at least four to six inches of the chain extends in front of the downwardly extending deflector member, thus enabling use of the chain saw at a point remote from the operator to cut small flexible branches, which are cut by the chain when they impact against the deflector, which also prevents the small diameter branches from being whipped back onto the operator. Lever means are provided forming a part of the saftey attachment operable by the operator to quickly and easily attach and remove the safety attachment without use of tools. For assisting in the placement of the apertures in the hardened steel blade of the chain saw to receive the safety attachment, there is provided a template that may be used as a drill jig for properly locating and boring the apertures in the blade.

BRIEF DESCRIPTION OF THE DRAWINGS

FIG. 4 is an exploded view partly in vertical section illustrating a second embodiment of the rotatable pin and method of its attachment to the associated journal flanges.

FIG. 5 is a plan view of a template for guiding the placement of apertures in the blade of the chain saw and for assisting in boring the apertures.

FIG. 6 is a top edge view of the template of FIG. 5, a portion of the protective paper shown in dash lines and pulled away from the adhesive coated back side of the template.

FIG. 7 is a view of a carbide tipped twist drill for use in boring the attachment apertures in the saw blade.

DESCRIPTION OF THE PREFERRED EMBODIMENT

In terms of greater detail, the safety attachment for chain saws of my invention comprises an article of manufacture that may be applied to already manufactured chain saws as an after-assembly or after-distribution device. However, it is also susceptible of being manufactured by or for the chain saw manufacturer and included with a chain saw as an optional accessory when the chain saw is sold to a customer. When sold as an accessory by the manufacturer, it is reasonable to expect that the apertures for its application will already have been applied to the blade by the chain saw manufacturer. That is of course not the case where the safety device is purchased by a saw owner as an article of manufacture to be applied to a saw that is already owned.

Figure 1:
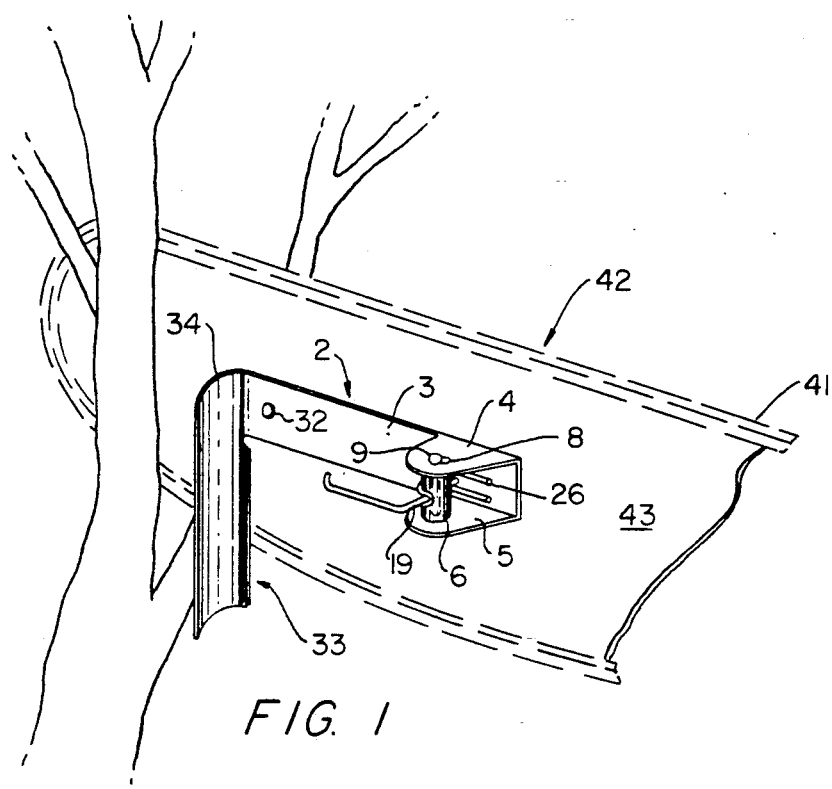
FIG. 1 is a perspective view illustrating the safety attachment of the invention applied to a chain saw and shown in position of use to cut a small branch near its root.
Figure 2:
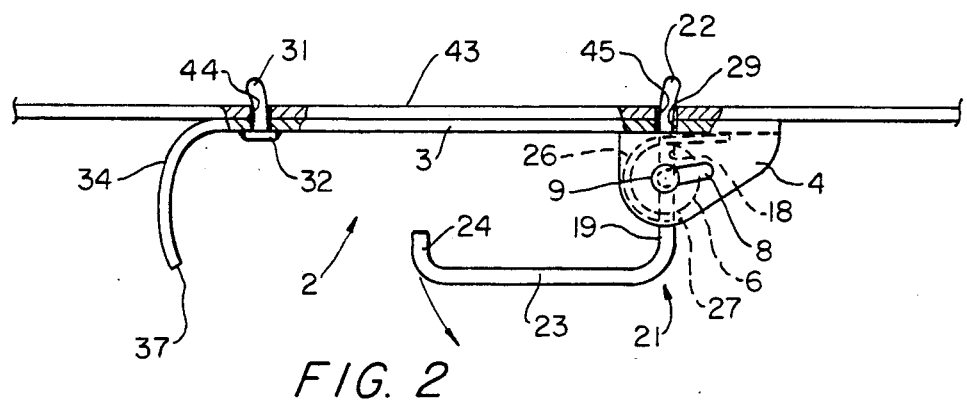
FIG. 2 is a fragmentary plan view of a chain saw blade or chain guide with the safety attachment applied thereto.
Figure 3:
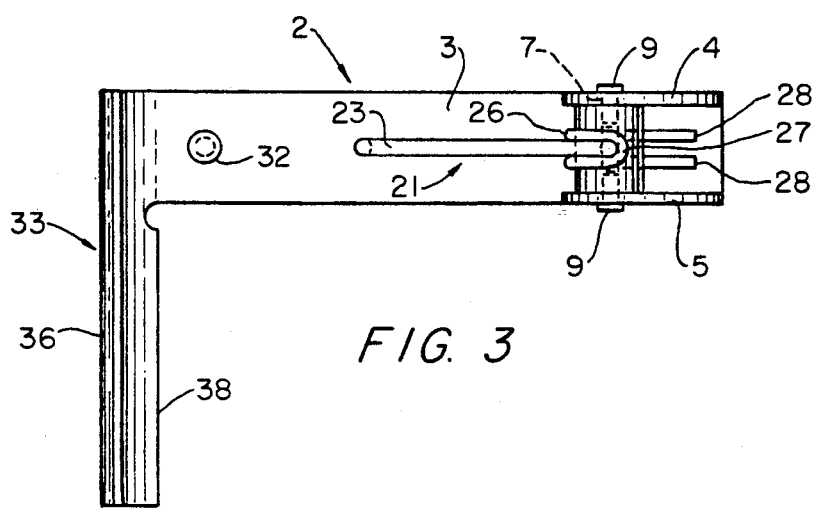
FIG. 3 is a side elevational view of the safety attachment shown apart from the chain saw.

Referring to the drawings, it is seen from FIGS. 2 and 3 that the safety attachment of the invention is designated generally by the numeral 2, and includes a base plate 3 formed from heavy gauge sheet steel, say ⅛" thick, or of sufficient thickness that the base plate is inflexible. The placement of the base plate on a chain saw having a 14" chain guide, for instance, may be approximately 4½" from the tip of the blade or guide, but of course this distance may vary depending upon the length of the chain saw guide and the environment in which the chain saw is to be used.

At one end of the base plate, there are formed two lugs or flanges 4 and 5 extending perpendicularly from opposite edges of the base plate and integral therewith, and being spaced apart in parallelism as shown. The flanges form a bearing for a cross pin 6 that extends between the two flanges and which, in one embodiment, is rotatably mounted thereon by reduced diameter end portions 7 rotatably journaled in the opposed flanges. Flanges 4 and 5 are provided with elongated slots 8 to receive the reduced diameter end portions 7 while permitting pivotal rotation of the reduced diameter portions and lateral displacement of the rotational axis of the pin 6 for reasons which will appear hereinafter. The pin is retained locked between the two flanges 4 and 5 by cap screws 9 that screw into the bored and threaded opposite ends of the pin 6 to provide heads larger than the aperture or slot within which the reduced diameter portions 7 of the pins are journaled.

Alternatively, the construction illustrated in FIG. 4 may be utilized to rotatably support the pin between the two spaced and parallel flanges. As shown in FIG. 4, the pin 6 is of uniform diameter for its entire length, and is gauged to fit snugly yet rotatably between the two spaced flanges. A threaded bore 12 is formed axially in each opposite end of the pin, and the bore is engaged by the threaded shank 13 of a hardened cap screw designated generally by the numeral 14, and provided with a cylindrical shoulder 16 that performs a double function. On the one hand, the cylindrical shoulder fits rotatably in the slots 8 formed in the flanges 4 and 5, and functions as a journal for rotation of the pin 6 in relation to the flanges 4 and 5. On the other hand, the cylindrical shoulders function as stops to limit the penetration of the screw shank into the threaded bore. The height of the shoulder is gauged to be slightly greater than the thickness of the base material from which the flanges 4 and 5 are formed, to thus provide sufficient clearance for rotation of the pin without binding on the flanges or the heads 17 of the screws.

Extending press-fitted through a transverse bore 18 formed medianly in the pin 6 between the two spaced parallel flanges 4 and 5 is the lever portion 19 of a bail designated generally by the numeral 21, and which is also provided with a locking end portion 22 and a handle portion 23 integral with the lever portion on the end thereof opposite the locking end portion, the handle portion 23 lying in a plane substantially parallel to the plane of the base plate and spaced outwardly therefrom. A reentrant flange 24 is provided on the free end of the handle portion to facilitate grasping the handle securely to effect rotation thereof and of the pin 6 and locking end portion 22 against the resilient resistance imposed by a spring 26, one end portion of which is looped about the pin 6 and anchored as at 27 around the lever portion 19. The opposite ends 28 of the spring impinge and react against the base plate 3 between the two upright flanges 4 and 5 as shown in the drawings.

It will be seen from the drawings, that the locking end portion 22 is slightly bent rearwardly, and passes through an aperture 29 formed in the base plate. The aperture 29 is somewhat larger than the diameter of the locking end portion as shown.

At the other end of the base plate, there is provided a lock lug 31 having a head 32, the lock lug extending tightly through an aperture in the base plate spaced medianly between the two opposite edges thereof as shown in FIG. 3, and spaced inwardly from the extreme forward end of the base plate. The lock lug 31 is bent slightly forwardly at about the same angle as the locking portion 22, but in the opposite direction therefrom, and is conveniently welded to the base plate to ensure that it will not loosen. Additionally, it should be noted that the two locking members 22 and 31 lie in a common horizontal plane that also includes the lever member 19, the handle portion 23 and the reentrant flange 24.

Formed on the forward end of the base plate is a downwardly extending deflector member designated generally by the numeral 33, and comprising an integral extension of the base plate. As shown in the drawings, the integral transition between the base plate and the deflector member is a curved portion 34 of the base plate ahead of the lock lug 31. The deflector member then proceeds downwardly in an elongated portion 36 that is slightly curved or arcuate in its transverse dimension to provide beam-like rigidity, the elongated portion 36 being defined by longitudinal edges 37 and 38. The edge 38 lies spaced outwardly from the base plate so as to provide clearance for passage of the chain 41 of the chain saw 42 when the safety attachment is detachably secured to the blade 43 of the chain saw.

To detachably secure the safety attachment of the invention to the chain saw, the blade 43 is provided with two circular bores 44 and 45 positioned medianly on the blade between the upper and lower chain guide edges and spaced longitudinally along the blade at an interval slightly less than the distance separating the extreme ends of the two locking members 22 and 31, but substantially the same as the distance between the roots of the two locking members measured at the face of the base plate. This spacing enables the handle 23 to be manipulated in the direction of the arrow to effect counterclockwise rotation of the pin 6 and conterclockwise pivotal movement of the locking member 22 in relation to the base plate in opposition to the resilient force exerted on the handle and pin 6 by the spring 26. Also enabled is a slight lateral displacement of the journals 7 of the pin in the slots 8 to thus accommodate lateral displacement of the locking member 22 in the apertures 29 and 45.

While held in this contracted position, the locking members 22 and 31 are then inserted into the apertures 44 and 45 until the base plate lies flat against the side surface 43 of the blade as shown in FIG. 2. The handle is then released, allowing the spring to again expand the distance between the locking members 22 and 31 to their maximum spacing, causing the locking members to engage the inner peripheries of the apertures 44 and 45, and to be canted away from each other to effectively lock the safety attachment to the blade.

To remove the safety attachment, all that is necessary is that the handle again be manipulated counterclockwise, contracting the distance between the locking members 22 and 31, whereupon the safety attachment may be pulled away from the face of the blade 43 and removed from the chain saw. The chain saw may now be used without the impediment of the safety attachment.

Because it is expected that my safety attachment for chain saws will be applied to many chain saws already in the possession of the owners thereof, and since the chain guide blades of such saws are not equipped with apertures such as 44 and 45 through which the safety attachment may be detachably secured to the blade, it is necessary that the owner bore the two apertures in proper position. The chain guide blade of chain saws are fabricated from hardened steel to withstand the countless hours of frictional engagement of the chain with the guide.

Since it is expected that most owners of chain saws will not be equipped with a drill bit of the type required to bore the apertures 44 and 45, it is contemplated that my safety attachment as described above will constitute one component of a kit including a template designated generally by the numeral 51 as illustrated in FIGS. 5 and 6. The kit will also include a carbide tipped drill bit 52 of appropriate size as illustrated in FIG. 7, for use by the owner in boring the necessary apertures.

Referring to FIG. 5, the disposable template is preferably fabricated from highly compressed card stock, or card board, but may be fabricated from thin metal stock. The template is preferably configured to conform to the configuration of the end portion of the chain saw blade, having a curved nose portion 53, a top edge 54 that conforms to the top edge of the blade 43, and two spaced apertures 55 and 56 that are properly spaced and sized to cooperate with the spacing of the locking members 22 and 31. Preferably, the back side 57 of the template body is coated with an appropriate adhesive layer 58 covered prior to use of the template with a removable protective paper film 59. Provided on the face of the template are annular metal washers 61 and 62 placed about and axially aligned with the apertures 55 and 56 as shown. The washers are preferably adhesively secure to the face of the template and function to guide and support the carbide drill bit during boring of the apertures 44 and 45. It will thus be seen that all that is required to utilize the template is to remove the protective paper covering from the back side 57 of the template and carefully align the nose portion 53 and the top edge 54 with the corresponding portions of the blade, then press the template onto the blade. The apertures 44 and 45 may now be easily and accurately drilled in the blade using the carbide bit provided and an appropriate drill moter (not shown). The template is then removed from the now apertured saw blade.

Having thus described the invention, what is believed to be new and novel and sought to be protected by letters patent of the United States is as follows.

I claim:

1. A safety attachment for a chain saw having a chain guide in the form of an elongated metal plate extending from a chain saw housing longitudinally along a longitudinal axis to support the upper and lower reaches of a chain, said safety attachment prevents the lower reach of the chain from whipping small diameter flexible branches sought to be cut toward an operator, comprising:

a) a base member detachably latchable to the chain guide adjacent the end thereof remote from the housing and latchable against movement relative to the chain guide when the chain saw is in use;

b) means on the base member manipulable to selectively latch or unlatch the base member from the chain guide; and c) deflector means mounted on the base member and adapted to project from the base member perpendicularly to the longitudinal axis and spaced rearwardly of the chain guide end remote from the housing and below the lower reach of the chain when the chain saw is in use with the safety attachment latched thereon whereby small diameter flexible branches impelled rearwardly toward an operator by the lower reach of the chain impinge upon the deflector means and are stopped from striking an operator.

2. The safety attachment for a chain saw according to claim 1, wherein said means on the base member manipulable to detachably latch the base member to the chain guide against movement relative to the chain guide when the chain saw is in use includes a pair of spaced locking members selectively operable to detachably engage the chain guide at points spaced longitudinally therealong.

3. The safety attachment for a chain saw according to claim 1, wherein said deflector means comprises an elongated beam having one end connected to said base member adjacent one end thereof and projecting perpendicularly therefrom and below the lower reach of the chain.

4. The safety attachment for a chain saw according to claim 1, wherein said base member is selectively detachably latchable to said chain guide medianly along the longitudinal axis of the chain guide.

5. The safety attachment for a chain saw according to claim 1, wherein said deflector means comprises an integral extension of the base member from one end thereof turned laterally away from the base member and formed to present a beam-like arcuate cross-section laterally spaced from the base member.

6. In combination, a chain saw having a housing and including a chain having upper and lower reaches and an elongated metallic chain guide plate extending cantilever-like therefrom and having a free end remote from the housing and upper and lower edges, the upper and lower reaches of said chain, respectively, being adapted to travel along said upper and lower edges when the chain saw is operated, and a safety attachment detachably latched to the guide plate between the upper and lower reaches of the chain and including deflector means spaced from the free end of the guide plate and extending perpendicular to the long dimension of the guide plate and the lower reach of the chain and fixed against movement relative to the chain guide plate when detachably latched to the guide plate, and extending below the lower reach of the chain a sufficient distance during use of the chain saw to intercept small diameter flexible branches drawn rearwardly by the lower reach of the chain to stop such branches from striking an operator of the chain saw.

7. The combination according to claim 6, wherein said safety attachment includes a base member detachably latched to the chain guide plate adjacent the end thereof remote from the housing of the chain saw.

8. The combination according to claim 6, wherein said chain guide plate is provided with a pair of longitudinally spaced apertures medianly spaced between the upper and lower edges thereof, and said safety attachment includes a pair of spaced locking members detachably latched in said apertures to detachably lock the safety attachment to the guide plate.

9. A safety attachment for a chain saw having a chain guide in the form of an elongated metal plate extending from a chain saw housing to support the upper and lower reaches of a chain, said safety attachment prevents the lower reach of the chain from whipping small diameter flexible branches sought to be cut toward an operator, comprising:
a) a base member detachably secured to the chain guide adjacent the end thereof remote from the housing;
b) means on the base member manipulable to selectively engage or disengage the base member from the chain guide;
c) deflector means adapted to project from the base member and below the lower reach of the chain whereby small diameter flexible branches impelled rearwardly toward the operator by the lower reach of the chain impinge upon the deflector means and are stopped from striking the operator; and
d) said base member including a pair of spaced bearing flanges extending perpendicularly from the base member, and said means manipulable to engage or disengage the base member to the chain guide includes a pin rotatably journaled between the spaced bearing flanges, a lever member mounted on said rotatable pin and including a locking member on one end thereof and a handle member on the other end thereof, and means resiliently biasing the locking member in a direction to detachably lock said base member to an associated chain guide.

10. A safety attachment for a chain saw having a chain guide in the form of an elongated metal plate extending from a chain saw housing to support the upper and lower reaches of a chain, said safety attachment prevents the lower reach of the chain from whipping small diameter flexible branches sought to be cut toward an operator, comprising:
a) a base member detachably secured to the chain guide adjacent the end thereof remote from the housing;
b) means on the base member manipulable to selectively engage or disengage the base member from the chain guide; and
c) deflector means adapted to project from the base member and below the lower reach of the chain when the chain saw is in use whereby small diameter flexible branches impelled rearwardly toward the operator by the lower reach of the chain impinge upon the deflector means and are stopped from striking the operator; and
d) said base member formed from a flat metallic elongated strip having a longitudinal axis, said means for detachably securing the base member to the chain guide including a pair of spaced locking members spaced medianly along the longitudinal axis of the base member, and a handle manipulable to engage or disengage said locking members from said chain guide, said locking members and said handle lying in a common plane coincident with the longitudinal axis of the base member.

11. In combination, a chain saw having an elongated metallic chain guide plate having upper and lower edges and a chain including upper and lower reaches adapted to travel, respectively, along said upper and lower edges when the chain saw is operated, and a safety attachment detachably secured to the guide plate between the upper and lower reaches of the chain and including deflector means extending below the lower reach of the chain a sufficient distance to intercept small diameter flexible branches drawn rearwardly by the lower reach of the chain to stop such branches from striking an operator using the chain saw;
b) said chain guide plate being provided with a pair of longitudinally spaced apertures medianly spaced between the upper and lower edges thereof, and said safety attachment includes a pair of spaced locking members detachably engaging said apertures to detachably lock the safety attachment to the guide plate; and c) said safety attachment includes a handle on said base member connected with one of said locking members and manipulable to shift the position of said locking member to engage said locking member with one of said apertures, and means operatively associated with said handle and said locking member to resiliently retain the locking member detachably engaged in said aperture in said chain guide plate.

12. In combination, a chain saw having a housing and including a chain having upper and lower reaches and an elongated metallic chain guide plate extending therefrom and having upper and lower edges, the upper and lower reaches of said chain, respectively, being adapted to travel along said upper and lower edges when the chain saw is operated, and a safety attachment detachably latched to the guide plate between the upper and lower reaches of the chain and including deflector means fixed against movement relative to the chain guide plate and extending below the lower reach of the chain a sufficient distance during use of the chain saw to intercept small diameter flexible branches drawn rearwardly by the lower reach of the chain to stop such branches from striking an operator of the chain saw;

a) said safety attachment including a base member detachably latched to the chain guide plate adjacent the end thereof remote from the housing of the chain saw; and b) said deflector means comprising a beam depending from said base member and below the lower reach of the chain, said beam having one longitudinal edge spaced laterally from the chain guide plate sufficient to provide clearance for the passage of the chain past the adjacent edge of the beam when the chain saw is operated.

* * * * *